Figure 1:
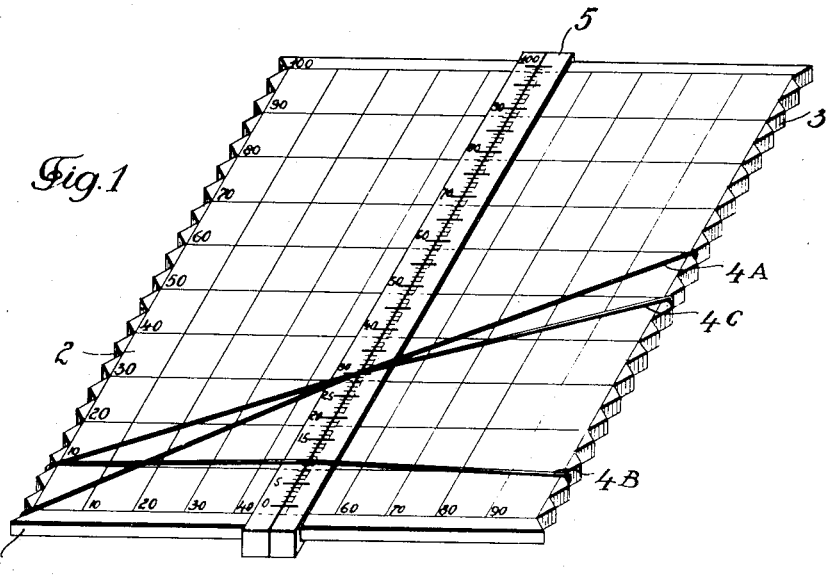

Sept. 22, 1942.                A. G. ROSIN                2,296,799
                           CALCULATING DEVICE
                           Filed Nov. 13, 1940

INVENTOR:
A. G. Rosin
BY
Michaelis & Michaelis
ATTORNEYS

Patented Sept. 22, 1942

2,296,799

UNITED STATES PATENT OFFICE 2,296,799

CALCULATING DEVICE

Axel G. Rosin, New York, N. Y.

Application November 13, 1940, Serial No. 365,414

1 Claim. (Cl. 235—61)

This invention relates to calculators, and more particularly to a device for computing various factors determining business operations.

It is an object of the invention to provide a device of the type aforesaid whereby to calculate the results of a business operation on the basis of certain fixed and variable factors.

It is a further object of the invention to provide a device of the type aforesaid whereby to calculate the profit or loss of a sales operation on the basis of such fixed or variable factors as volume, gross margin, fixed costs and variable costs.

It is a still further object of the invention to provide a device of the type aforesaid which can be sold cheaply, which is easy to operate and which is capable of speedily demonstrating the results of one operation as well as the changes resulting from a variation of one or several of the factors determining the operation.

Other objects, and the manner in which they are attained, will appear from the following description.

Various phases of business require calculations based on a number of fixed and variable factors. Up to now it has been customary to perform such calculations either arithmetically or with the aid of a graph especially prepared for each occasion wherein various factors were plotted against each other, certain geometric relations of the resulting curves then demonstrating the results of the calculations. However, both the arithmetic and the graphic methods proved to be time consuming; for example, in the case of the graphic method, when it was desired to change certain factors to meet changed conditions, it became necessary either to crowd additional curves into the original graph or else to prepare a new graph, either method being slow and little adapted to permit a comparison between the various results.

I have now found that these drawbacks are obviated and an improved mode of calculation and demonstration of the result is arrived at if a simple device is employed which may be described as an animated graph wherein displaceable elements representing the curves which demonstrate certain factors move over a surface provided with a proper graphic subdivision, certain geometric relations of these lines again demonstrating the desired result of the calculations. The new device permits of readily placing these movable elements in the positions required by the prevailing values of the various factors, as well as of adjusting these elements to any new positions which a change in these values may require, the results of the calculations being instantly apparent in both cases.

In the drawing affixed to this specification and forming part thereof one embodiment of the invention is illustrated diagrammatically by way of example.

Figure 2:
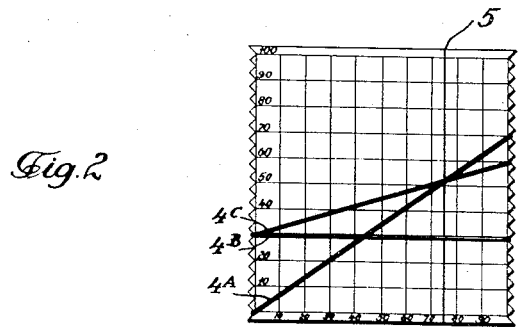

In the drawing,

Fig. 1 is a perspective view of a physical embodiment of the invention simultaneously indicating a first example of a calculation, whereas Fig. 2 is a diagrammatic showing of a second example of a calculation.

Referring now to the drawing and first to Fig. 1, 1 is a base made of any suitable material such as a plastic, cardboard, sheet metal or the like. On its upper surface, this base carries a suitable graphic subdivision as indicated at 2, which may be printed, engraved or otherwise provided on the base, this subdivision comprising lines spaced equidistantly, two series of lines being provided at right angles to each other, the outermost line to the left, for example, representing the ordinate while the bottom line, for example, represents the abscissa, these lines being marked from 0 to 100, for example, i. e. by 0, 10, 20 etc. or by 0, 5, 10, 15 etc., according to the degree of accuracy required. While the abscissa indicating the basis for the calculation should always be subdivided from 0 to 100 or from 0 to 10 or in a similar manner, the subdivision of the ordinate must not necessarily extend over the entire range denoted on the abscissa, the range of the ordinate subdivision being determined by the top value which the largest variable factor may take under certain conditions, e. g. for retail purposes. Thus, in a calculator designed for the retailer a subdivision of the ordinate extending up to about 55 or 60 would be sufficient as in retailing, the gross margin will never exceed such an amount.

At 3 the base, or if desired only one or several sides or surfaces thereof, is provided with a toothed rim, the grooves of which may be engaged by the elastic endless bands 4 (including bands 4A, 4B and 4C), which preferably though not necessarily are the well known elastic or rubber bands used as office supplies, but which also may take the form of wires, strings, or other elastic or extensible material. A transparent cover (not shown) may be arranged on the top surface of the base to protect the printing, etc., thereon, the bands 4 in this instance moving over the transparent cover, or a cover, transparent or otherwise, may be arranged fixed or for removal to protect both the bands and the base.

A slide 5 is provided to move over the base in parallel to the ordinate. If this slide is provided merely in the form of another band or the like (which, however must not be elastic as it will always move at right angles to the top and bottom of the base), it serves the purpose of connecting the prevailing point of intersection of certain of the other bands with the scale provided at the bottom, for example, and thus will facilitate reading the abscissa value for this point of intersection.

In a preferred embodiment of the invention, however, the slide 5 is provided in the form of a, preferably transparent, ruler, i. e. as a strip of transparent material bearing a subdivision or scale corresponding to that of the abscissa or ordinate for a purpose to be described below.

In order to illustrate the mode of operation of the new calculator device reference is had to the following example. A sales proposition may require deduction of fixed costs and variable costs on the basis of a certain volume of business from the gross margin on the basis of this same volume of business, for the purpose of showing the profit and loss of the operation.

In the example illustrated in Fig. 1, the gross margin is assumed to be 60%, calculated on the volume. Assuming that the abscissa illustrates the volume and the ordinate the respective values of the various fixed and variable factors, the elastic band 4A representing the gross margin is placed to extend from ordinate 0, corresponding to abscissa (volume) 0, to ordinate 60, corresponding to abscissa (volume) 100. The fixed overhead is 10. Accordingly, the elastic band 4B is placed to extend, for the entire range of volumes, along the ordinate value of 10. The variable overhead is 40% of the volume. Since this has to be superimposed on the fixed overhead of 10 so that the total overhead, at a volume of 100, becomes 50, the rubber band 4C representing the variable overhead is placed to extend from 10 to 50. The abscissa value of the point of intersection of bands 4A and 4C gives us the result of the calculation, i. e. the volume below which an operation based on the above factors will result in a loss while a higher volume will result in a profit. To facilitate reading of the abscissa value at this point the slide 5 is moved over this point of intersection; where the slide 5 intersects with the scale at the bottom we find the result of our calculation. In our example, this point is at 50, indicating that the operation will result in a profit only if the volume exceeds 50.

In order to ascertain the profit accruing, under the conditions of the calculation, from a certain volume, the slide 5 is moved to the point of the bottom scale denoting this particular volume. Now the slide 5 will intersect at one point with the band 4A and at another point with the band 4C. The difference between the points of intersection for bands 4A and 4C, read on the scale of slide 5, then denotes the amount of profit to be made on the basis of the volume to which slide 5 has been adjusted, it being assumed that this slide has been moved to the right of the points of intersection of bands 4A and 4C.

Fig. 2 illustrates the manner whereby a change in the various factors is taken care of by a simple readjustment of the bands. The gross margin being 70, band 4A is adjusted to extend from 0 to 70. The fixed overhead is 30. Band 4B is accordingly moved to extend along the 30 ordinate. The variable overhead is also 30; band 4C is correspondingly adjusted to extend from 30 (the ordinate of the fixed overhead) to 60. Moving the slide 5 over the point of intersection of bands 4A and 4C and reading the amount at the bottom, it is at once apparent that in this case the critical volume amounts to 75, a profit resulting only from a volume exceeding this amount.

I prefer to use bands of different colors to indicate the particular factors represented by each. A number of additional bands may be provided to permit of subdividing the areas allotted to various factors, for example, in order to indicate the various items of which the variable overhead is composed.

The calculator according to the present invention has been found to be very useful in calculating the results of business operations and generally predetermining future business policies. While it is not designed for calculations requiring a great deal of accuracy it is of great value whenever it is desired to perform calculations speedily and to compare the influences of variations of the various different factors.

I wish it to be understood that I do not desire to be limited to the exact details of the invention as shown and described as various modifications within the scope of the appended claim will occur to one skilled in the art.

I claim:

A calculating device, particularly adapted for calculating the result of a business operation comprising in combination: a polygonal base provided with a graphic subdivision, the abscissa of which denotes the volume, the ordinate the value of certain factors, a plurality of extensible line-shaped elements arranged on said base for mutually independent displacement across said subdivision along two opposite sides of said base whereby to represent a plurality of fixed and variable factors, a slide arranged on said base for displacement across said subdivision along two other oppostie sides of said base, and a scale on said slide to coordinate the point of intersection of said two extensible elements so that its abscissa value can be read on said scale.

AXEL G. ROSIN.